United States Patent [19]
MacMullan

[11] 3,927,360
[45] Dec. 16, 1975

[54] NULL-BALANCE SERVO SYSTEM
[75] Inventor: Samuel Jay MacMullan, Newtown, Pa.
[73] Assignee: Leeds & Northrup Company, North Wales, Pa.
[22] Filed: Nov. 30, 1972
[21] Appl. No.: 310,819

[52] U.S. Cl. ............... 318/619; 318/621; 318/611; 318/617; 318/651
[51] Int. Cl.² ........................................ G05B 5/01
[58] Field of Search ........... 318/611, 619, 618, 621, 318/617, 651

[56] References Cited
UNITED STATES PATENTS

| | | | |
|---|---|---|---|
| 2,954,514 | 9/1960 | Hemstreet | 318/611 |
| 3,012,180 | 12/1961 | Finvold | 318/611 X |
| 3,242,407 | 3/1966 | Hansen | 318/619 X |
| 3,391,317 | 7/1968 | Bell | 318/619 X |
| 3,493,826 | 2/1970 | Wandrey | 318/621 X |
| 3,505,606 | 4/1970 | Werner | 318/619 X |
| 3,523,232 | 8/1970 | Hall et al. | 318/611 |
| 3,604,907 | 9/1971 | Wesner | 318/619 X |
| 3,633,854 | 1/1972 | Buchholz | 318/619 X |
| 3,686,568 | 8/1972 | MacMullan | 318/617 X |
| 3,708,754 | 1/1973 | Diehl | 318/619 X |
| 3,732,478 | 5/1973 | MacMullan | 318/618 X |

Primary Examiner—T. E. Lynch
Attorney, Agent, or Firm—Woodcock, Washburn, Kurtz & Mackiewicz

[57] ABSTRACT

In a positional servo measuring system, the velocity is limited by an adjustable large signal velocity feedback circuit in a path that is independent of small signal feedbacks. The effect of small signal acceleration feedback or small signal velocity feedback is decreased when large signal velocity feedback occurs so that more large signal velocity feedback gain may be provided when the velocity is limited. Large signal velocity feedback occurs when a signal proportional to the velocity exceeds a threshold. In one embodiment, the adjustment is provided by an adjustable gain amplifier that operates upon the signal proportional to velocity. In another embodiment, the adjustment is provided by an adjustable threshold signal source.

7 Claims, 9 Drawing Figures

NULL-BALANCE SERVO SYSTEM

BACKGROUND OF THE INVENTION

This invention relates to null-balance servo systems, and more particularly, to speed control in null-balance servo systems for measuring an unknown represented by an input signal.

One well-known approach to speed control in null-balance systems involves the use of velocity feedback. For example, an AIEE paper entitled "Limiting In Feedback Control Systems", Ralph J. Kochenburger, December, 1952, describes the use of large signal velocity feedback for speed control. Velocity feedback systems for speed control are also disclosed in an article entitled "Speed Control: Four Methods Compared", A. S. Audeh and A. N. Deodhar, December, 1970, as well as U.S. Pat. No. 3,419,771 — Bentley et al. However, none of these systems involve the use of large signal velocity feedback in conjunction with small signal acceleration feedback or small signal velocity feedback signal in a null-balance system let alone provide a threshold for the large signal velocity feedback.

As set forth in copending application Ser. No. 240,637, filed Apr. 3, 1972, in the name of this inventor, the use of small signal acceleration feedback is particularly important in null-balance systems so as to render the small signal dynamic performance of the system substantially insensitive to changes in motor parameters and load mass due to the mounting of accessories. It is therefore important that any speed control using large signal velocity feedback be completely compatible with small signal acceleration feedback if the advantages of a system as described in the aforesaid application are to be achieved. Moreover, it is particularly important that speed control in such systems be adjustable for reasons which will now be explained.

In a null-balance system such as a recorder, the slewing speed of the recorder is a function of the voltage constraint on the electrical input to the recorder motor and the coupling device between the motor and the load including the pen carriage, controls, etc. In general, manufacturers of recorders have varied the slewing speed from recorder to recorder in their product lines by utilizing different coupling devices and/or different amplifiers, and even different motors for each recorder in their product line for achieving different motor shaft velocities with a given amplifier. They have not relied upon adjustable, velocity feedback speed control.

In some applications of recorders, it is desired to record rapid fluctuations in the input signal; whereas, in other applications, it is desired to obscure these fluctuations.

It will of course be appreciated that this prior art method of achieving different speeds in different recorders within a product line is extremely costly, and in many instances, a number of gear heads must be stocked for a single recorder in order to meet the various speed requirements for that recorder. Moreover, the various amplifiers are in themselves expensive since small quantities of each type of amplifier are required. Such small quantities do not lend themselves to the latest developments in electronic packaging where tooling costs must be spread over large quantities in order to be economically feasible. Of course the use of different amplifiers and different coupling devices precludes, at least to a very great extent, the use of common production procedures which could substantially lower the cost of manufacturing recorders.

In short, the failure to provide a means by which slewing speed can be readily changed or adjusted from recorder to recorder in a product line, has increased the cost of all recorders in that line.

SUMMARY OF THE INVENTION

It is an overall object of this invention to provide a null-balance system wherein the speed of the system may be adjusted without great difficulty.

It is a more specific object of this invention to provide a null-balance system having small signal acceleration and/or velocity feedback with a readily adjustable speed control in the form of large signal velocity feedback.

It is a further specific object of the invention to provide such a null-balance system wherein the speed of the system may be readily adjusted without adversely affecting the dynamic performance of the system.

In accordance with these and other objects of the invention, a null-balance servo system embodying the invention comprises means for producing an error signal related to the difference between an input signal and an overall system feedback signal for restoring balance to the system, and a detector comprising amplifying means responsive to the error signal for correcting the unbalance of the system. Small signal acceleration and/or velocity feedback means are provided for reducing the error signal. Large signal velocity feedback means are provided for further reducing the error signal when the speed of the system exceeds a predetermined threshold. Means are also provided for decreasing the effect of the small signal feedback relative to the large signal velocity feedback when the velocity feedback exceeds the threshold so as to permit the large signal velocity feedback to dominate the operation of the system thereby establishing a velocity controlled mode of operation for the system.

In accordance with another important aspect of this invention, the large velocity threshold can be adjusted to control the speed of the motor. In one embodiment, this is accomplished by providing the large signal velocity feedback means which forms a loop including a threshold generating diode network, means for adjusting the gain of the large signal velocity feedback means and a compensating feedback network so as to permit the speed to be varied over a wide range by varying the gain to be adjusted without a significant variation in the bandwidth of the loop.

In another embodiment of the invention, threshold-generating diode networkds are utilized in conjunction with adjustable threshold signal sources to control the large signal velocity feedback.

DETAILED DESCRIPTION OF PREFERRED EMBODIMENTS

Figure 1:
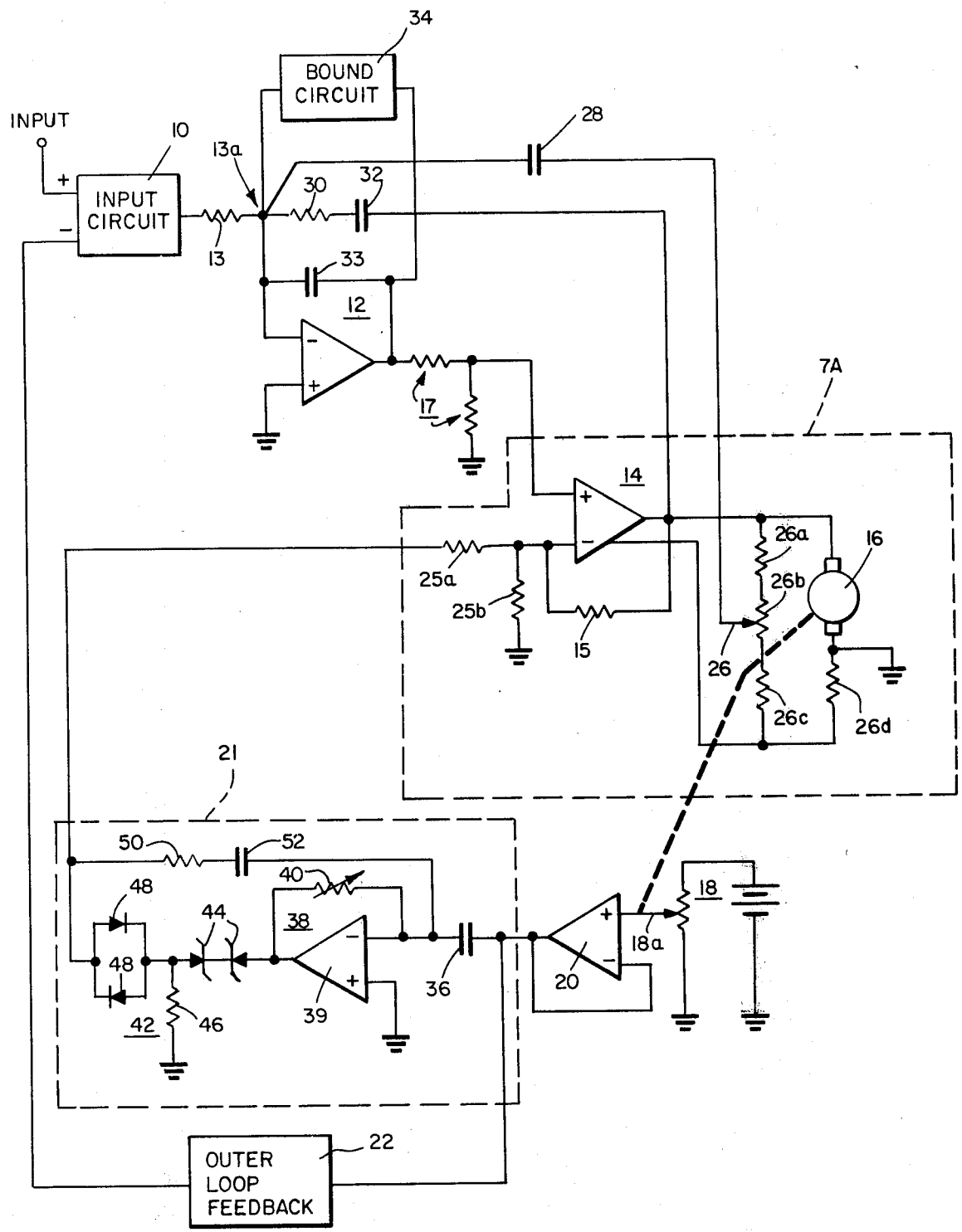
FIG. 1 is a schematic-block diagram of a null-balance servo system embodying the invention.

As shown in FIG. 1, a null-balance servo system comprises means for generating an error signal representing the difference between an input signal and an overall system feedback restoring signal. A detector for the error signal comprises an input circuit 10 shown in block diagram form, a signal processing amplifier 12, connected to the input circuit through a resistor 13, and a power amplifier 14. The power amplifier 14 including a gain-determining feedback resistor 15, has a non-inverting input terminal connected to the output of the signal processing amplifier 12 through input resistor circuitry 17. The output of the power amplifier 14 is connected to a terminal of a DC motor 16 which is mechanically coupled to an adjustable circuit element 18. As the adjustable tap 18a of the adjustable circuit element 18 moves in response to movement of the motor 16, a feedback signal is generated which is in turn applied to a feedback amplifier 20. The output of the feedback amplifier 20 is then coupled to the input circuit 10 by means of an outer or position feedback loop including a feedback network 22 which is shown in block diagram form.

A small signal acceleration feedback path extends from a tap 26 in a motor bridge circuit including resistors 26a, 26b, 26c and 26d through a capacitor 28 connected to the inverting terminal of the signal processing amplifier 12. Small signal acceleration feedback is also developed from the motor voltage utilizing an RC network including a small resistor 30 and a capacitor 32 which reduces the error signal applied to the motor 16. Due to the presence of an integrating capacitor 33 associated with the amplifier 12, the error signal at the output of the amplifier 12 is reduced by small signal acceleration feedback as well as small signal velocity feedback.

In addition to the position and small signal acceleration feedback paths, a large signal velocity feedback path including a speed control network 21 and input resistors 25a and 25b of the power amplifier 14 are provided. The purpose of the large signal velocity feedback path between the feedback amplifier 20 and the power amplifier 14 is to provide negative feedback to the power amplifier when a threshold is reached so as to further reduce the magnitude of the error signal which is applied to the motor 16 and thereby control the motor speed. This threshold must be reached by a signal that is proportional to the velocity in order to limit the rate of adjustment for the adjustable circuit element 18.

In accordance with this invention, the signal processing amplifier 12 is provided with a bound circuit 34 connected between the input and the output of the signal processing amplifier 12 to limit or decrease the effect of the small signal acceleration feedback as well as the small signal velocity feedback relative to the large signal velocity feedback when the rate of adjustment of the adjustable circuit element 18 exceeds the threshold established by the large signal velocity feedback circuit 21. In other words, the bound circuit 34 is active, or becomes active, when the large signal velocity threshold has been exceeded so as to permit the large signal velocity feedback to dominate the small signal acceleration and velocity feedbacks.

As shown in FIG. 1, the large signal velocity feedback circuit 21 comprises a differentiating capacitor 36 and an adjustable gain amplifier 38 which includes operational amplifier 39 and a variable resistor 40 connected between the output and the inverting terminal thereof. By providing the adjustable gain capability for the amplifier 38, it is possible to vary the magnitude of the signal applied to the diode threshold circuitry 42 for any given rate of adjustment that is within the span of the velocity limits for the adjustable circuit element 18. In other words, the threshold circuitry 42 including the reverse-poled, series connected Zener diodes 44, a resistor 46 connected to circuit common, and parallel, oppositely poled diodes 48 will pass large signal velocity feedback signal to the power amplifier 14 at a threshold corresponding to the speed predetermined by the setting of the variable resistor 40. This permits the speed of the motor 16 and the rate of adjustment of the circuit 18 to be varied by a simple adjustment of a resistor thereby eliminating the necessity for utilizing different and complex coupling devices to vary the speed while permitting the use of the same basic null-balance system amplifier.

In accordance with another important aspect of the invention, a compensating feedback subloop including a resistor 50 and a capacitor 52 are provided between a junction of the diodes 48 and the inverting terminal of the amplifier 38. This compensating feedback loop permits the optimum large signal velocity feedback loop gain regardless of the motor speed setting.

When the resistor 40 is adjusted to vary the velocity limit, a different gain is applied in the large signal velocity feedback path. This tends to cause different loop gains in the loop including the large signal velocity feedback path and the amplifier 14, the motor 16 and the adjustable circuit means for different settings of the adjustable resistor 40. The adjustable gain amplifier 38 sums the currents at its inputs from capacitor 36 and the capacitor 52 of the compensating feedback path. Only when the threshold is exceeded does the compensating feedback path act upon the component of the output of the adjustable gain amplifier 38 that passes through the threshold means. The compensating feedback path dominates over the path through resistor 40 to control the gain in the large signal velocity feedback path when the threshold is exceeded.

As indicated in the foregoing, the effective threshold of the large signal velocity feedback circuit 21 and thus the speed of the motor 16 and its corresponding rate of adjustment for the adjustable circuit element 18 can be varied by varying the resistor 40 of the adjustable gain amplifier. In this way, the speed of the null-balance system may be readily adjusted without drastic changes in the system.

Figure 2:
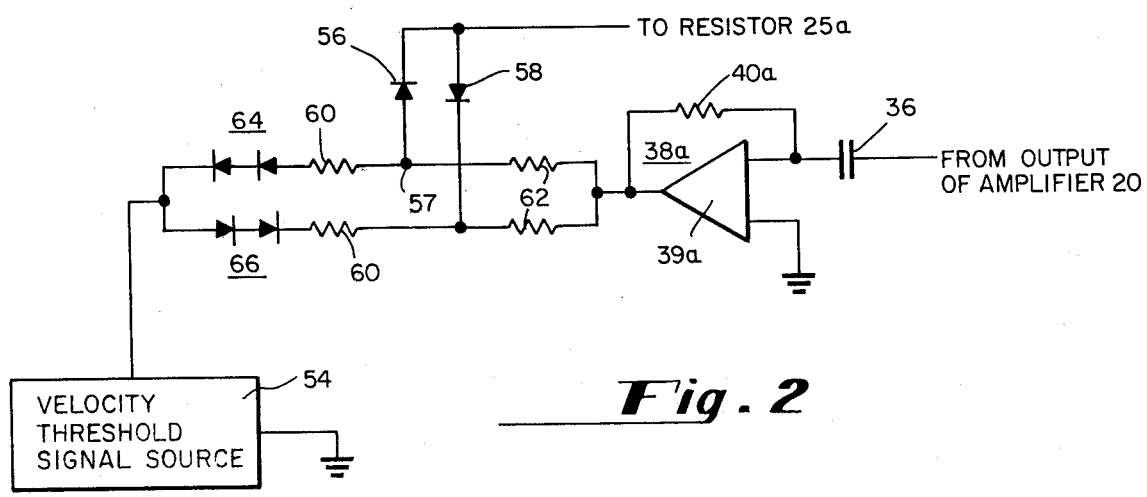
FIG. 2 is a schematic diagram of alternative large signal velocity feedback circuitry which may be utilized in the system shown in FIG. 1.

An alternative large signal velocity feedback circuit shown in FIG. 2 may be substituted for the circuitry enclosed within the dotted lines 21 of FIG. 1 to provide this same adjustable capability. As shown in FIG. 2, an adjustable velocity threshold signal source 54, which may be a variable voltage source or its digital equivalent, is connected to a pair of oppositely poled diodes 56 and 58 which serve to block signals at the output of an amplifier 38a which are proportional to the rate of adjustment of the adjustable circuit 18a unless those signals exceed thresholds established by signal source 54 whereupon, the diodes 56 and 58 are forward biased. Equal resistors 60 and 62 couple the voltage at the output of the amplifier 38a and the voltage at the output of the signal source 54 to terminals of the diodes 56 and 58. Compensating diodes 64 and 66 are provided in series with the resistors 60.

The compensating function of the diodes 64 and 66 will now be explained assuming that the blocking diode 56 has been forward biased by a negative rate of change of the tap 18a. With ideal diodes, the voltage across resistor 62 is equal to the voltage across resistor 60 because node 57 is at a virtual ground where the positive voltage at the output of the amplifier 38a is equal in magnitude to the magnitude of the negative voltage at the output of the source 54. The presence of a real diode 56 causes a voltage drop which reduces the voltage across resistor 62 and increases the voltage across the resistor 60 by the same amount. The presence of real diodes 64 reduces the voltage across resistor 60 by one diode drop to compare with the ideal and by one diode drop to compare with the voltage across resistor 62. It will of course be appreciated that a lack of perfect compensation results in unequal magnitudes of speed sensing output from the amplifier 38a and the source 54 when the speed is limited by the large signal velocity feedback. The effect of the unequal diode drops is more pronounced when the range of the signals at the inputs of the adjustable threshold or dead zone circuitry is small.

Figure 3:
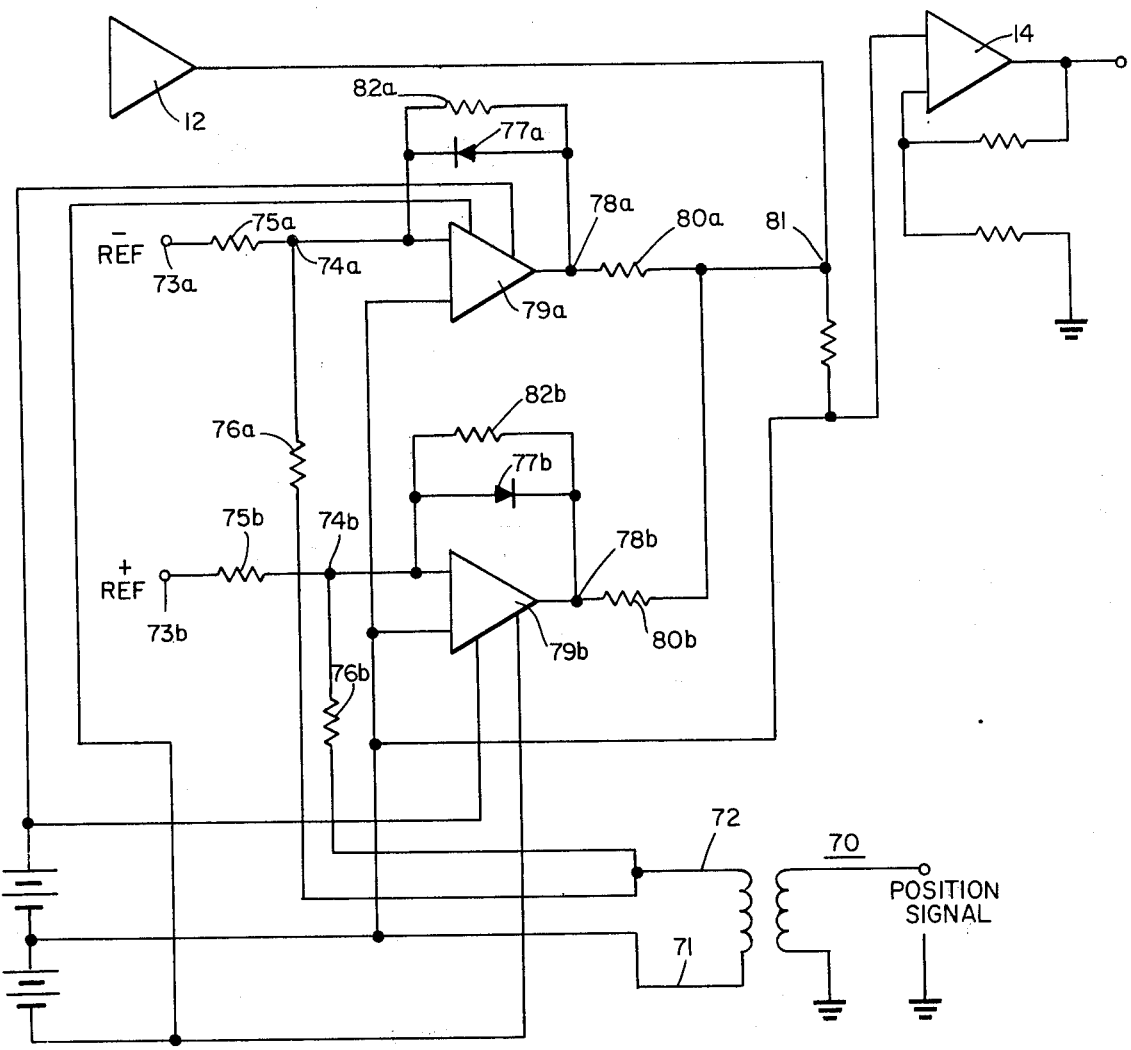
FIG. 3 is a schematic diagram of another large signal velocity feedback circuit which may be utilized in the system of FIG. 1.

An alternative embodiment of an adjustable threshold or dead zone circuit, which may be substituted for the circuitry enclosed within dotted lines 21 of FIG. 1, is shown in FIG. 3. This eliminates the necessity for knowing in advance whether or not the polarity of the rate of change at the tap 18a coincides with the polarity of the voltage at the source 54. A transformer 70 produces a velocity signal at line 72 referred to common line 71. Positive and negative external velocity threshold signal sources (adjustable reference sources) 73a and 73b are connected to sum points 74a and 74b by resistors 75a and 75b. The velocity signal is connected to sum points 74a and 74b by equal resistors 76a and 76b. When the magnitude of the velocity is below the thresholds the sum of the currents through the resistors connected to respective sum points passes through diodes 77a and 77b, resulting in small voltages at inverting amplifier outputs 78a and 78b, since the inverting amplifiers 79a and 79b act to maintain the sum of the diode and resistor currents equal to a negligible amplifier input current.

A negligible sum voltage of the inverting amplifier output voltages appears between line 81 and line 71. Hence the input voltage to amplifier 14 is equal to the output voltage of amplifier 12. Now, suppose that a positive velocity signal occurs at line 72 that is sufficiently large to cause current through resistor 76a to exceed the current through resistor 75a. This causes the feedback current of inverting amplifier 79a to switch from diode 77a to resistor 82a resulting in an output voltage that is proportional to the current difference between current in resistor 76a and resistor 75a. The sum voltage between line 81 and line 71 is primarily proportional to this difference since the output of inverting amplifier 79b remains substantially unchanged. Now the input voltage of amplifier 14 is equal to the sum of this sum voltage and the voltage at the output of amplifier 12. This sum voltage constitutes a negative feedback which is proportional to the difference between the velocity signal and a threshold established by the external velocity threshold signal sources.

Figure 4:
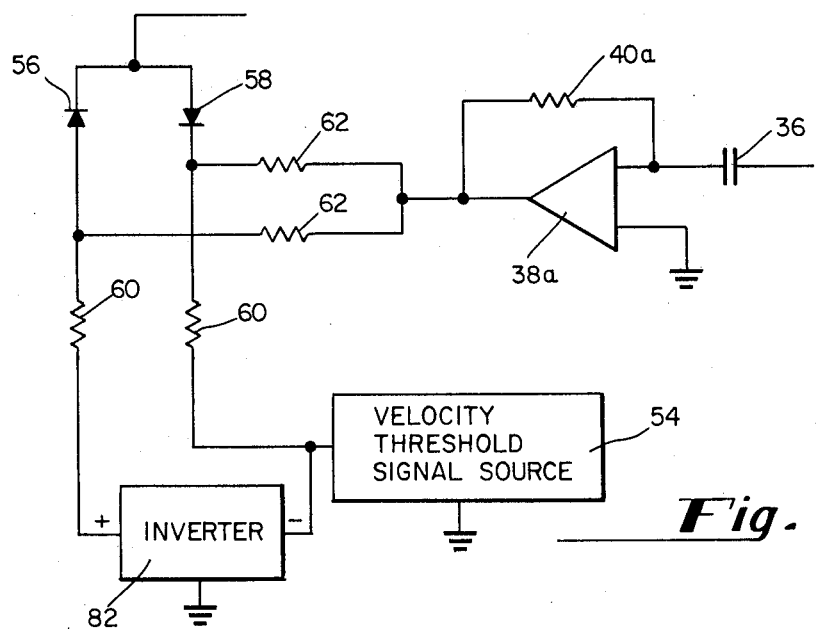
FIG. 4 is a schematic-block diagram of still another large signal velocity feedback circuit which may be utilized in the system of FIG. 1.

The velocity feedback circuitry shown in FIG. 4 is simiar to that of FIG. 2 except that an inverter 82 makes it possible to simultaneously apply positive and negative velocity threshold signals to the resistive branch connected to the diode 56 as well as the diode 58. This also eliminates the necessity for knowing in advance whether or not the polarity of the rate of change at the tap 18a coincides with the polarity of voltage at the source 54. With the polarities shown for the inverter 82, the diodes 56 and 58 will always be appropriately forward biased when the rate of change exceeds the threshold determined by the resistors 60 and 62 as well as the magnitude of the voltage from the source 80 regardless of the polarity of that rate of change. In the circuitry of FIG. 2, the voltage at the source 54 must be negative for a positive voltage from the differentiating operational amplifier 38a in order to forward bias the diode 56. Similarly, the voltage from the threshold source 54 must be positive when the voltage at the differentiating operational amaplifier 38 is negative in order to forward bias the diode 58.

Figure 5:
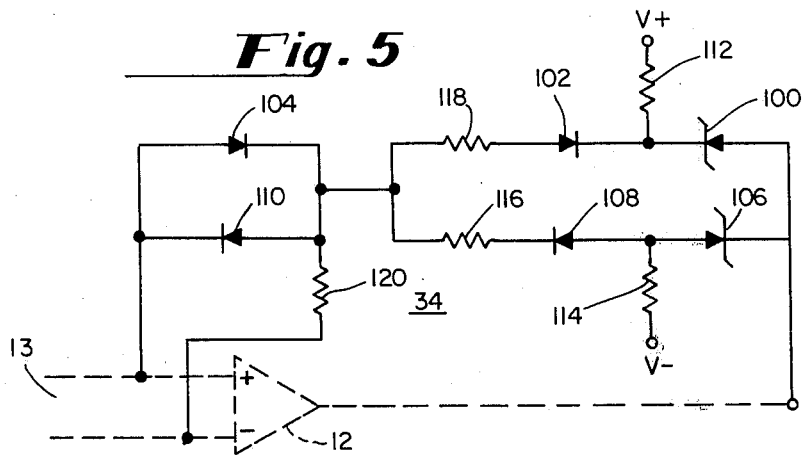
FIG. 5 is a schematic diagram of a particular bound circuit which may be utilized in the system of FIG. 1.

A specific embodiment of the bound circuit 34 shown in FIG. 1 is shown in FIG. 5. The bound network is designed to remain substantially nonconductive if the output voltage of amplifier 12 falls within a predetermined range and becomes substantially conductive when this output voltage exceeds that range. This is accomplished by utilizing a first bounding branch which includes a first Zener diode 100 and first conventional diodes 102 and 104 connected in series relation and a second Zener diode 106 and second conventional diodes 108 and 110 connected in series relation. The first Zener diode 100 is biased into the breakdown region by connecting the junction between the conventional diode 102 and the Zener diode 100 to a d-c power supply V$^+$ through a current-limiting resistor 112. The second Zener diode 106 is biased into the breakdown region by connecting the junction between the conventional diode 108 and the Zener diode 106 to a d-c power supply V$^-$ through a current-limiting resistor 114. Under unbounded conditions, the conventional diodes 102 and 108 are reverse-biased to render both bounding branches nonconductive. Under bounded conditions, a conventional diode pair, 102 and 104, or 108 and 110 will be forward-biased depending on polarity of the signal.

The junction of the two Zener diodes is connected together and to the output of the amplifier 12. As the output voltage increases in the positive direction, the rise in voltage drop across resistor 114 forward-biases diode 108 and current will flow through diode 108, resistor 116 and diode 110 to the input of amplifier 12.

Figure 6:
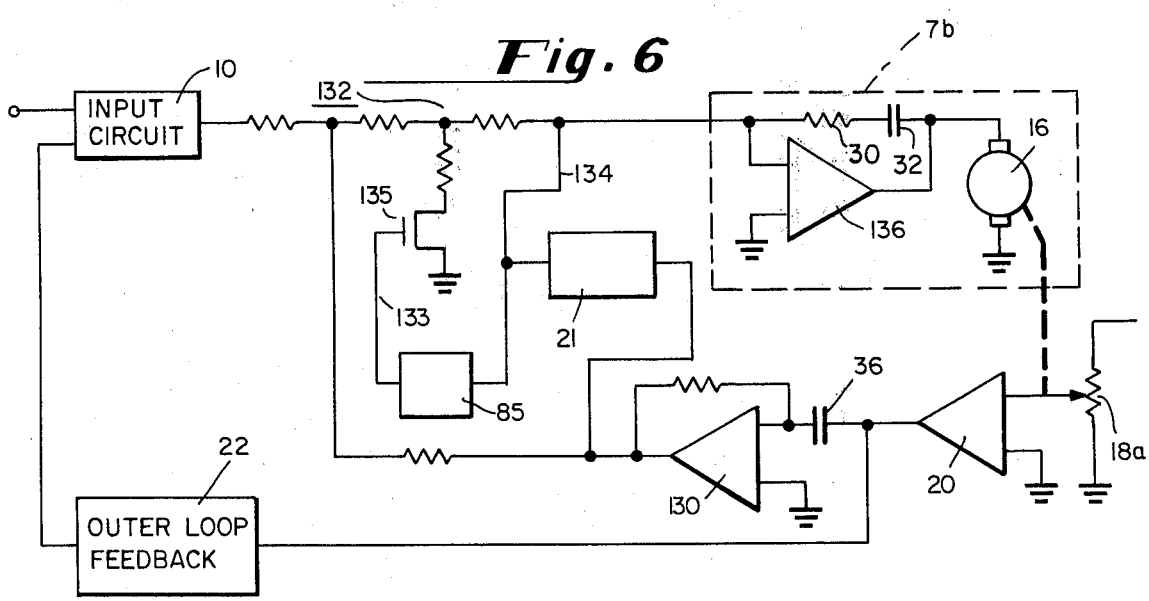
FIG. 6 is a schematic-block diagram of another embodiment of the invention.

In an alternative embodiment shown in FIG. 6 where components similar to FIG. 1 will have the same numbers, the effect of a small signal velocity feedback on the error signal is reduced relative to the effect of the large signal velocity feedback once the large signal velocity threshold is exceeded. The small signal velocity feedback is produced by amplifier 130. The sum of the output of the input circuit 10 and small signal velocity feedback is developed at the input of attenuating means 132. When a non-negligible large signal velocity feedback occurs at line 134, a control signal is developed at line 133 by detecting means 85, which causes transistor 135 to become more conductive. This causes reduced gain for the sum and attenuates the effect of the small signal velocity feedback relative to the large signal velocity feedback error signal. The speed control network 21 may be as shown in FIG. 1 including an amplifier for generating the large signal velocity feedback from the velocity feedback at the output of the amplifier 130. The network 21 may also be replaced by circuitry as shown in FIGS. 2, 3 and 4. An amplifier 136 acts as amplifier 12 combined with amplifier 14 of FIG. 1.

In FIG. 6 where the error signal is equal to the sum of the output of input circuit 10 and small signal velocity feedback produced by amplifier 130, the error signal is limited in order to limit the small signal velocity feedback so that the large signal velocity feedback becomes substantially zero when the error signal becomes substantially zero in spite of the attenuation, setting of threshold, etc. This permits control of the point where the system begins to decelerate from the speed corresponding to the threshold, by the relative magnitudes of position error and small signal velocity feedback.

The advantages offered by the circuit of FIG. 6 will now be described in detail. The velocity of the motor is proportional to the voltage applied to the power amplifier, at low frequencies. The acceleration of the motor is proportional to this voltage at higher frequencies. At still higher frequencies, other resonances and/or time constants occur in motor and/or power amplifier which cause constraints on the loop gain of the subloop including the large velocity feedback path, the amplifier 136, the motor 16 and the adjustable circuit means. The effective bandwidth is proportional to the voltage-to-acceleration gain and the small signal velocity feedback gain, when the velocity is below the threshold. The effective bandwidth is proportional to the voltage-to-acceleration gain ahd the sum of the small signal velocity feedback gain and the large signal velocity feedback gain when velocity exceeds the threshold. Hence, the effective bandwidth is increased by the addition of large signal velocity feedback. If the effective bandwith exceeds the constraints imposed by the above resonances or time constants, oscillation or ringing occurs.

Increased utilization of the availble bandwidth is achieved if the gain that operates on the small signal velocity feedback is reduced when the large signal velocity feedback becomes active. Large signal velocity feedback gain is defined as the ratio of large signal velocity feedback to the difference between the velocity and the threshold. This gain is zero when the velocity is below the threshold and finite when it is above or equal to the threshold, as when the large signal velocity feedback becomes active.

Figure 7A:
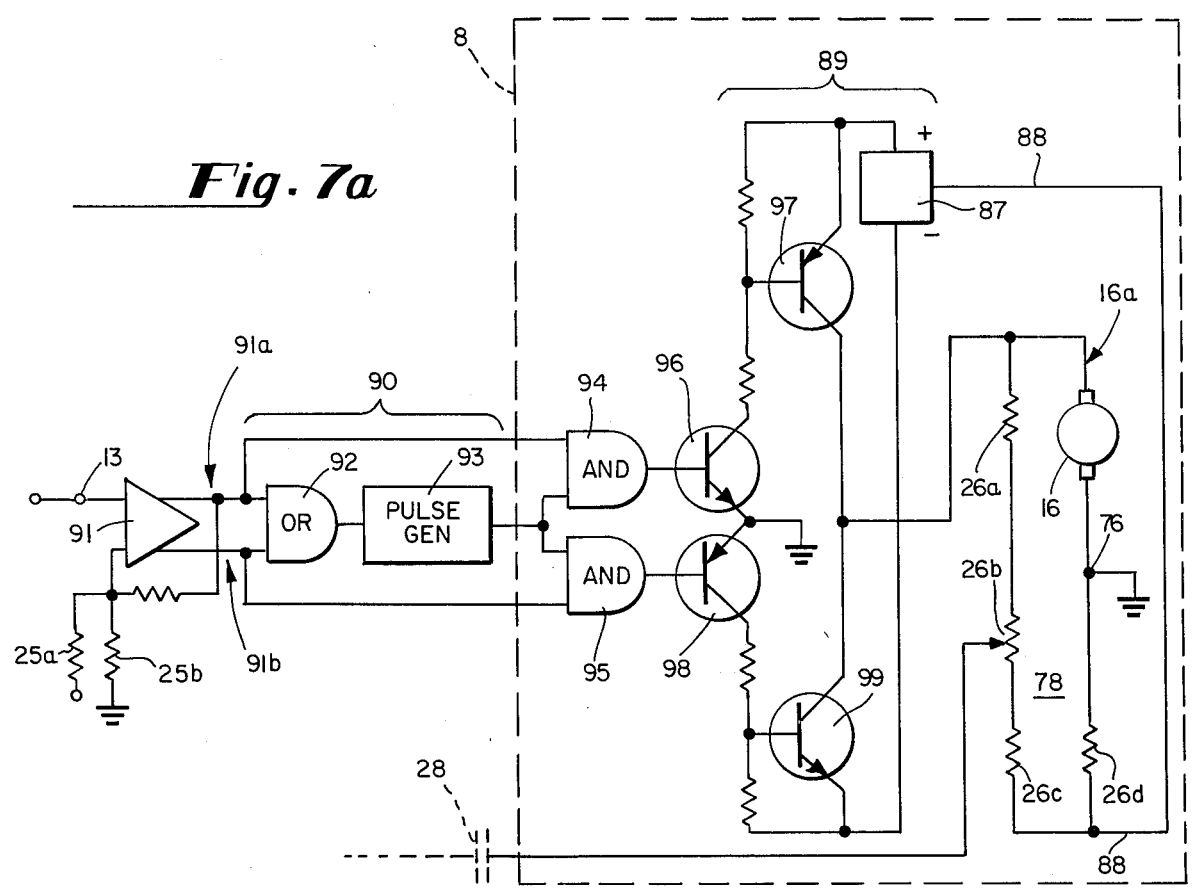
FIGS. 7a and 7b are schematic-block diagrams of a switch-mode amplifier embodiments of the invention.

In another embodiment of the invention, the circuitry of FIG. 7a may be utilized in place of the circuitry enclosed within block 7a in FIG. 1. In FIG. 7a the power amplifier 14 has been augmented with a switch mode amplifier 89 and pulse modulator 90 coupled to the output of the amplifier 91. The amplifier 91 has differential outputs, 91a and 91b, connected to the inputs of OR gate 92. The output of the OR gate is connected to an input of the pulse generator 93 in order to modulate the pulse generator pulse frequency and/or the pulse width, for instance, as shown in U.S. Pat. No. 3,384,833 — Hitt and assigned to the assignee of this invention. The output of the pulse generator 93 is connected to one of the inputs of AND gate 94 and one of the inputs of AND gate 95. The other input of AND gate 94 is connected to amplifier output 91a and the other input of AND gate 95 is connected to amplifier output 91b. Coincidence between the proper polarity of the output of the amplifier 91 and the proper binary state of the output of the pulse generator 93 yields a unique output of an AND gate which causes a pulse to be delivered to the motor by way of switching transistors 96, 97, or 98, 99 coupled to a three terminal power supply 87. The polarity of the pulse delivered to the motor is representative of the relative polarity of the differential outputs of amplifier 91.

Figure 7B:
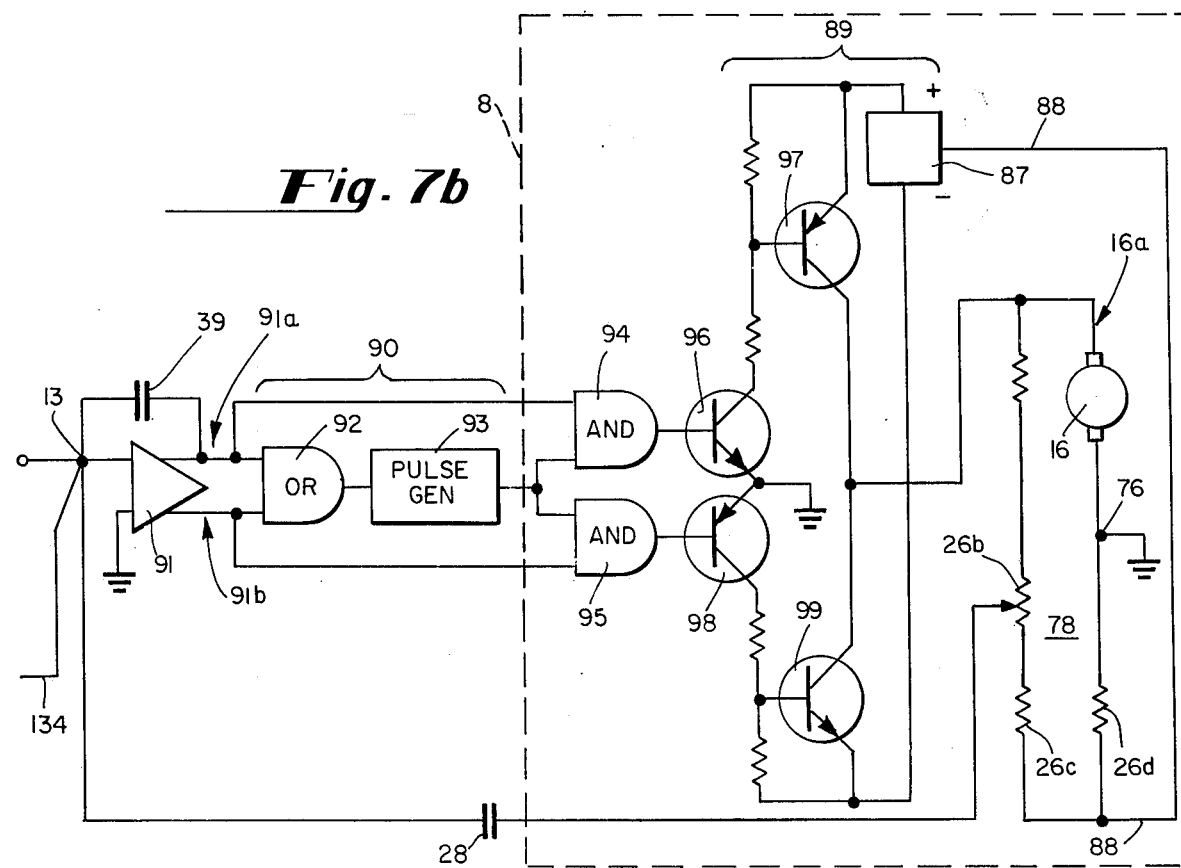

The circuitry of FIG. 7b may be utilized in place of the circuitry within block 7b of FIG. 6. In FIG. 7b, amplifier 136 is augmented with a switch mode amplifier 89 and a pulse modulator 90 coupled to the output of the amplifier 91. The acceleration feedback path including the resistor 30 and the capacitor 32 in FIG. 6 is substituted by acceleration feedback path via capacitor 28 in FIG. 7b. Components with the same reference characters as in FIG. 7a perform in a similar manner.

As pointed out in the aforesaid copending application Ser. No. 240,637, discrepancies between the motor voltage derivative and the feedback through capacitor 39 are tolerable because the acceleration feedback through capacitor 28 is dominant insofar as the outer loops are concerned.

Figure 8:
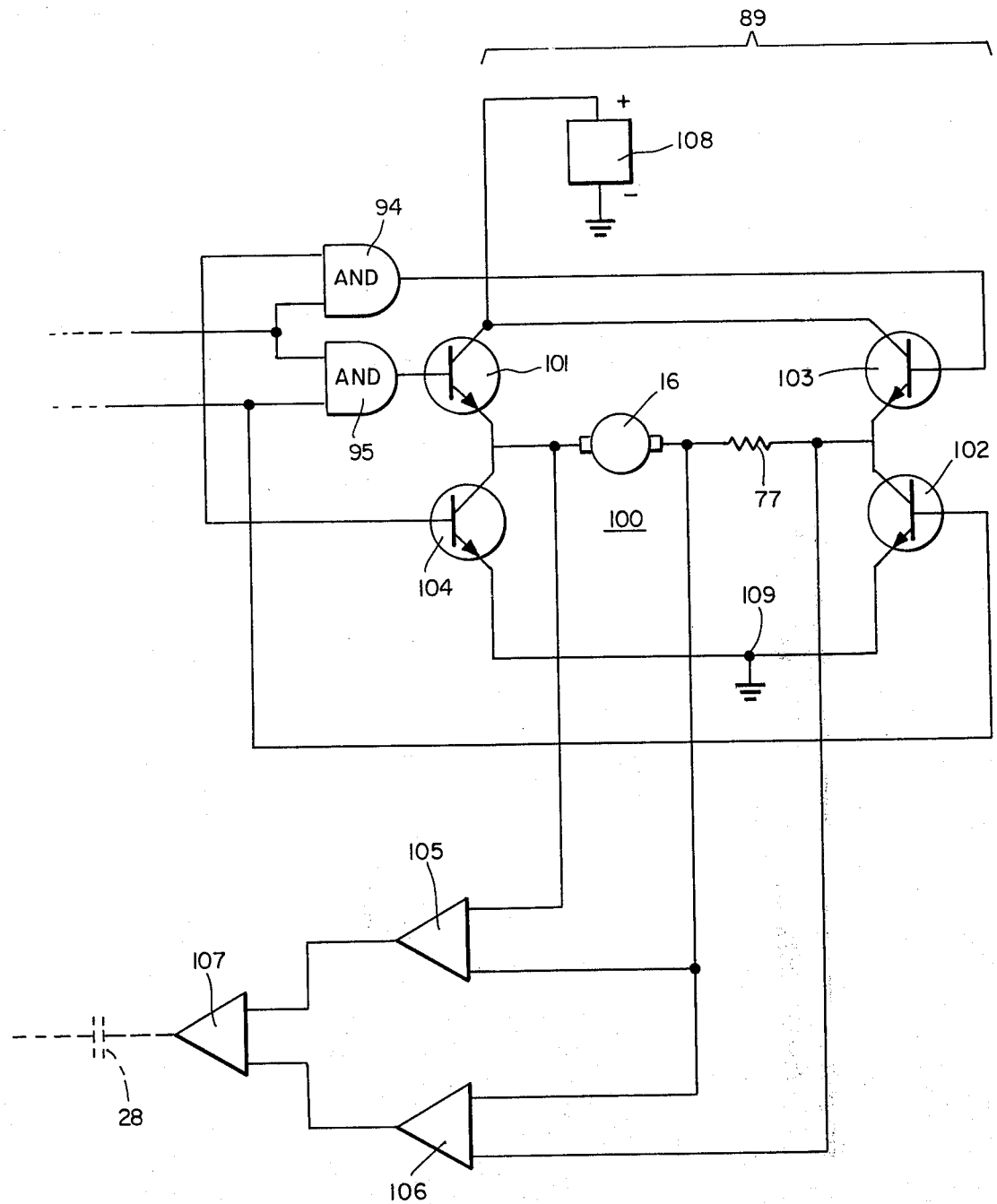
FIG. 8 is a schematic-block diagram of another switch-mode amplifier embodiment of the invention

The block enclosed by dotted line 8 in FIGS. 7a and 7b may be replaced by the circuitry of FIG. 8. In the embodiment of FIG. 8, the switch mode amplifier 89 of FIGS. 7a and 7b is replaced by a bridge-type switching mode amplifier 100. The power supply for the switching transistor bridge is shown as a two terminal power supply 108. This may be an advantage in AC line operated instruments that are operated without a transformer. This is also an advantage with battery operation. When a unique output occurs at the output of an AND gate, a pulse of proper polarity is delivered to the motor. Suppose that coincidence of the proper polarity of the output of the amplifier 91 and the binary state of the pulse generator exists so as to cause a unique output to occur from AND gate 94. This causes transistor 103 to turn ON. The proper polarity of the output of amplifier 91 causes transistor 104 to turn ON completing a current path of one polarity. The other pair of transistors 101, 102 operates in like manner, when a unique output exists from the AND gate 95, to complete a current path of the opposite polarity. It is apparent from the above discussion that the sense of the motor terminals with respect to the common 109 corresponds to the polarity. Thus a differential amplifier connected across the motor and a differential amplifier connected to resistor 77 are used to obtain motor voltage and motor IR drop signals with respect to common 109. These two signals combined by amplifier 107 cause an acceleration signal to pass through capacitor 28 as in FIG. 7a and FIG. 7b.

While various embodiments and modifications have been described in the foregoing specification and shown in the drawings, it will be understood that the appended claims are intended to cover all such embodiments and modifications that fall within the true spirit and scope of the invention.

What is claimed is:
1. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

signal processing amplifier means having an input coupled to the output of said input circuit;

power amplifier means having an input coupled to the output of said signal processing amplifier means and an output;

a motor coupled to said output of said power amplifier means for adjusting said adjustable circuit element in a direction to restore balance to said system;

means for reducing said error signal by small signal acceleration feedback and small signal velocity feedback signals, said small signal acceleration feedback signal being applied to the input of said signal processing amplifier;

means for reducing said error signal by large signal velocity feedback when said rate of change of said adjustable circuit element exceeds a predetermined threshold so as to establish a velocity controlled mode of operation for said system, said large signal velocity feedback signal being applied to the input of said power amplifier in proper phase relationship; and means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate said at least one small signal feedback thereby constraining the effective bandwidth of the system during said velocity controlled mode of operation, said means for decreasing the effect of said small signal feedback signals substantially limiting the small signal acceleration feedback that is applied to said signal processing amplifier when said rate of adjustment exceeds said threshold.

2. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

signal processing amplifier means having an input coupled to the output of said input circuit;

pulse modulation means having an input coupled to the output of said signal processing amplifier means;

switch mode amplifier means having an input coupled to the output of said pulse modulating means and an output;

a motor coupled to said output of said switch mode amplifier for adjusting said adjustable circuit element in a direction to restore balance to said system;

means for reducing said error signal by small signal acceleration feedback and small signal velocity feedback signals;

means for reducing said error signal by large signal velocity feedback when said rate of change of said adjustable circuit element exceeds a predetermined threshold so as to establish a velocity controlled mode of operation for said system;

means for applying said small signal acceleration feedback signal and said large signal velocity feedback signal to the input of said signal processing amplifier means; and means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate said at least one small signal feedback thereby constraining the effective bandwidth of the system during said velocity controlled mode of operation.

3. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

amplifying means having an input coupled to the output of said input circuit and an output;

a motor coupled to said output of said amplifying means for adjusting said adjustable circuit element in a direction to restore balance to said system;

said amplifying means further having a local feedback path from its output to its input comprising a capacitor and a resistor connected in series circuit relationship;

means for reducing said error signal by small signal acceleration feedback and small signal velocity feedback signals;

means for reducing said error signal by small signal acceleration feedback and small signal velocity feedback signals;

means for reducing said error signal by large signal velocity feedback when said rate of change of said adjustable circuit element exceeds a predetermined threshold so as to establish a velocity controlled mode of operation for said system;

means for applying said large signal velocity feedback means to the input of said amplifying means and said small signal velocity feedback signal to the output of said input circuit;

means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate said at least one small signal feedback thereby constraining the effective bandwidth of the system during said velocity controlled mode of operation; and said means for decreasing the effect of said small signal feedback signals including attenuating means coupled between the output of said input circuit and the input of said amplifiying means.

4. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

integrating amplifying means having an input coupled to the output of said input circuit;

pulse modulating means having an input coupled to the output of said integrating amplifying means;

switch mode amplifying means having an input coupled to the output of said pulse modulating means and an output;

a motor coupled to said output of said switch mode amplifying means for adjusting said adjustable circuit element in a direction to restore balance to said system;

means for reducing said error signal by small signal acceleration feedback and small signal velocity feedback signal;

means for reducing said error signal by large signal velocity feedback when said rate of change of said adjustable circuit element exceeds a predetermined threshold so as to establish a velocity controlled mode of operation for said system;

means for coupling said small signal acceleration feedback and said large signal velocity feedback to the input of said integrating and amplifying means; and means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate at least one small signal feedback thereby constraining the effective bandwidth of the system during said velocity controlled mode of operation, said means for decreasing the effect including attenuating means coupled between the output of said input circuit and the input of said amplifying means.

5. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

a motor coupled to said input circuit for adjusting said adjustable circuit element in a direction to restore balance to said system;

means for reducing said error signal by small signal acceleration feedback and small signal velocity feedback signals;

means for reducing said error signal by large signal velocity feedback when said rate of change of said adjustable circuit element exceeds a predetermined threshold so as to establish a velocity controlled mode of operation for said system, said means for reducing comprising a velocity feedback loop including adjustable gain amplifier means in series relationship with a threshold network comprising:

first and second inverting amplifiers;

an adjustable reference signal source having a negative terminal and a positive terminal;

an input of said first inverting amplifier being connected to said negative terminal and having a feedback path including a diode and a resistor in parallel circuit configuration, said diode being poled for current flow from the output of said first inverting amplifier to its input;

an input of said second inverting amplifier being connected to said positive terminal and having a feedback path including a diode and resistor in parallel circuit configuration, said diode being poled for current flow from the input of said second inverting amplifier to its output;

transformer means for coupling said adjustable circuit element and each said output to said first and second inverting amplifiers, said transformer means providing simultaneous differentiation and direct isolation; and resistive means for combining the outputs of said first and second inverting amplifiers for applying the output signals from said first and second inverting amplifiers between the output of said signal processing amplifiers and the input of said power amplifier; and means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate said at least one small signal feedback thereby constraining the effective bandwidth of the system during said velocity controlled mode of operation.

6. A null-balance servo system for measuring an unknown electrical quantity as an input signal comprising:

an adjustable circuit element for generating a position feedback signal representing the adjustable position of said adjustable circuit element;

an input circuit responsive to an input signal and said position feedback signal applied thereto for generating an error signal representing the unbalance of said system;

a motor coupled to said input circuit for adjusting said adjustable circuit element in a direction to restore balance to said system;

means for reducing said error signal by small signal acceleration feedback and a small signal velocity feedback signal;

means for reducing said error signal by large signal velocity feedback when said rate of change of said adjustable circuit element exceeds a predetermined threshold so as to establish a velocity controlled mode of operation for said system, said means for reducing including a threshold determining reference signal source, means for comparing a velocity signal with said reference signal so as to apply said velocity signal to reduce said error signal when said velocity feedback signal exceeds said threshold determined by said reference signal, a pair of parallel, oppositely poled diode means coupled to said reference signal source so as to block the large velocity feedback unless said velocity feedback exceeds said threshold, a first pair of parallel resistive means respectively coupled to terminals of said pair of diode means, and a second pair of parallel resistive means respectively coupling said terminals to said reference signal source; and means for decreasing the effect of at least one of said small signal feedback signals on said error signal relative to the effect of said large signal velocity feedback signal on said error signal when said large signal velocity feedback exceeds said threshold so as to permit the large signal velocity feedback to dominate said at least one small signal feedback thereby constraining the effective bandwidth of the system during said velocity controlled mode of operation.

7. The improved null-balance servo system of claim 3 wherein said attenuating means comprise:

a series arm including resistive means connected in series between said input circuit and said amplifying means;

a shunt arm including resistive means and a field effect transistor connected in series relationship between said series arm and circuit common; and means for rendering said field effect transistor conductive when the rate of adjustment of said adjustable circuit element exceeds said threshold for attenuating the output of said input circuit.

* * * * *